United States Patent [19]
Roshanravan

[11] Patent Number: 5,433,846
[45] Date of Patent: Jul. 18, 1995

[54] GREASE-TRAP WASTEWATER TREATMENT SYSTEM

[75] Inventor: Mel Roshanravan, Coppell, Tex.

[73] Assignee: Darling International Inc., Irving, Tex.

[21] Appl. No.: 970,858

[22] Filed: Nov. 3, 1992

[51] Int. Cl.$^6$ .............................................. C02F 3/30
[52] U.S. Cl. ................................. 210/195.1; 210/205; 210/221.1
[58] Field of Search ................... 210/605, 608, 195.1, 210/205, 221.1, 221.2

[56] References Cited

U.S. PATENT DOCUMENTS

| | | | |
|---|---|---|---|
| 3,617,539 | 11/1971 | Grutsch et al. | 210/608 |
| 4,053,394 | 10/1977 | Fisk | 210/605 |
| 4,372,856 | 2/1983 | Morrison | 210/608 |
| 4,430,225 | 2/1984 | Takamatsu et al. | 210/608 |
| 4,787,978 | 11/1988 | Nicol | 210/605 |
| 5,015,384 | 5/1991 | Burke | 210/608 |

Primary Examiner—Thomas Wyse
Attorney, Agent, or Firm—Harold E. Meier

[57] ABSTRACT

A method and apparatus for wastewater treatment to minimize solid-waste by-products requiring disposal in a landfill site. The system for carrying out the process utilizes initial screening and dissolved air flotation processes to remove a large portion of the solid-waste matter within the wastewater. The wastewater is then processed by anaerobic and aerobic means to clarify the wastewater to a point where it may be discharged into normal sanitary sewage systems. The solid-waste matter removed during the process is dewatered and composted. The composted matter may be used for land applications such as fertilizing or fill dirt.

5 Claims, 1 Drawing Sheet

5,433,846

GREASE-TRAP WASTEWATER TREATMENT SYSTEM

TECHNICAL FIELD

This invention relates to the treatment of wastewater products, and more particularly to the treatment of grease-trap wastewater contents to minimize disposal of solid-waste matter in a landfill site.

BACKGROUND OF THE INVENTION

Grease traps located at restaurants and fast-food operations require periodic cleaning to maintain trap efficiency and to prevent the discharge of grease and other solid-waste matter into sanitary sewer systems. Waste material removed from the grease trap must be disposed of by off-site means since existing sanitary sewer systems are not designed to receive the type of waste products removed from a grease trap. Such off-site disposal means include the use of a landfill site. The disposal of grease-trap waste contents at a landfill site promotes the contamination and pollution of large ground areas and provides no useful application for the grease-trap contents. Furthermore, present regulations regarding landfills may limit the amount of grease trap waste contents to be dumped at a landfill site.

Thus, the need has arisen for a method and apparatus for treatment of grease-trap waste contents promoting a more environmentally compatible solution.

SUMMARY OF THE INVENTION

The present invention overcomes the above difficulties with a system using both aerobic and anaerobic treatment processes on grease-trap waste contents. The system minimizes the creation of solid-waste matter that must be disposed of in a landfill site. The system uses both anaerobic and aerobic treatment processes to remove solid waste and dissolved organic matter from wastewater. Removed solids from the system of the present invention are dewatered by a belt press and are then composted. The composted solids may be used in land applications such as fertilizing. The clarified wastewater produced by the system is acceptable for disposal within normal sanitary sewage systems.

The system initially screens the wastewater to remove larger solid-waste matter particles. The wastewater is next anaerobically and aerobically processed. The anaerobic and aerobic processes use dissolved air flotation clarifiers utilizing gas entrained water to remove solid-waste matter from the wastewater. The anaerobic and aerobic processes also use digester apparatus which break down the solid-waste matter of the wastewater. The anaerobic digester uses anaerobic biological processes for breaking down the solid-waste matter while the aerobic digester uses aerobic biological processes. The two by-products of this system, the clarified wastewater and the composted solid-waste matter, are both more ecologically acceptable alternatives than dumping the grease trap contents into a landfill site.

BRIEF DESCRIPTION OF THE DRAWINGS

For a more complete understanding of the present invention and the advantages thereof, reference is now made to the following detailed description taken in conjunction with the accompanying drawing:

The drawing is a block diagram of the system for treatment of grease-trap wastewater.

DETAILED DESCRIPTION OF THE INVENTION

Figure 1:
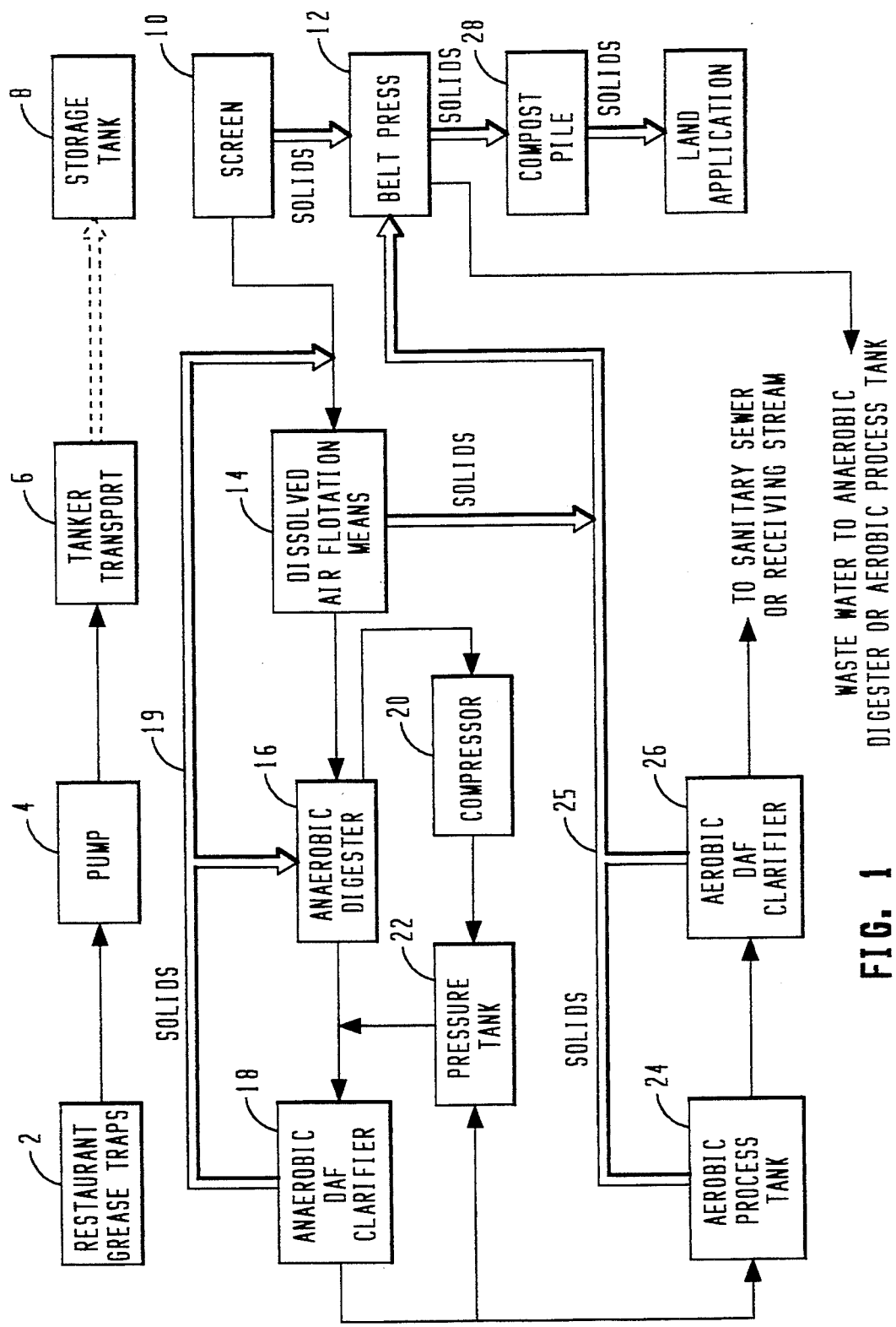

Referring now to the drawing, there is shown of a grease-trap wastewater treatment method and system. The process begins at a grease trap 2 of a restaurant or fast-food operation where the grease-trap wastewater to be processed are collected. A pump 4 removes wastewater from the grease trap 2 and transfers the wastewater to a tanker transport 6. The tanker transport 6 may be a truck, rail car or pipe-line system capable of transporting the grease-trap wastewater contents from the restaurant to a treatment facility.

At the treatment facility, a storage tank 8 receives the grease-trap wastewater from the tanker transport 6; the contents of the storage tank are mixed or agitated to prevent settling of solid-waste matter within the wastewater. The contents of the storage tank 8 are pumped across a screen 10, filtering the larger solid-waste matter particles from the liquid phase of the grease-trap wastewater. Solid-waste matter screened from the wastewater is passed on to a belt press 12 which will be more fully discussed later.

The remaining wastewater passes from the screen 10 to a dissolve air flotation (DAF) unit 14 wherein additional solid-waste matter is removed from the wastewater. In the dissolved air flotation unit 14, wastewater is pressurized in a pressurization tank (not shown) and air is entrained into the pressurized water. This water, along with flocculating chemicals, is introduced into a conventional DAF vessel (not shown). Bubbles form as the air entrained in the water is released from pressure. The bubbles attach themselves to particles in the wastewater, and as the bubbles rise to the surface, the particles are carried along. When the bubbles with attached particles reach the surface, the air escapes and forms a foam or sludge layer on the surface. The sludge layer contains the solid-waste particles deposited by the escaping air bubbles. The sludge layer is skimmed from the dissolved air flotation vessel and the removed solid-waste particles of the sludge layer are sent to the belt press 12 for processing.

The DAF effluent (the wastewater partially clarified by the dissolved air flotation unit) passes to the anaerobic digester 16. In the anaerobic digester 16, digestion of the solid-waste and dissolved organic matter within the wastewater is completed by gas-forming bacteria occurring within the digester. These bacteria carry out anaerobic biological processes to break down the solid-waste matter of the wastewater and reduce the carbonaceous biochemical oxygen demand of the wastewater. The wastewater next passes to an anaerobic dissolved air flotation clarifier 18.

The gasses created by the gas-producing bacteria within the anaerobic digester 16 are vented from the digester to a compressor 20 where the gases are compressed for storage in a pressure tank 22. Within the pressure tank 22, the compressed digester gases are entrained with recycled wastewater from the anaerobic dissolved air flotation clarifier 18. This water is injected into the anaerobic DAF clarifier 18 where the released gas bubbles raise solid-waste matter to the surface of the clarifier 18 for skimming in a manner similar to that of the dissolved air flotation unit 14.

The solid-waste matter (anaerobic bio-mass) skimmed from the surface of the anaerobic clarifier 18 is returned to the anaerobic digester by means of a transport path 19 where the solid-waste matter (bio-mass solids) continue the digestion process. Any excess solid-waste matter (bio-mass solids) is sent to the dissolved air flotation unit 14. Excess gases from the anaerobic digester 16 may be used as fuel in a boiler (not shown) to generate steam for maintaining the digester temperatures or to provide hot water for other uses within the system.

Wastewater from the anaerobic clarifier 18 not used in the pressure tank 22 pass to an aerobic-process tank 24. In the aerobic process tank 24 a waste activated sludge system utilizes aerobic biological processes to further breakdown solid-waste matter and reduce the carbonaceous biochemical oxygen demand of the wastewater. The wastewater from the aerobic process tank 24 passes to an aerobic dissolved air flotation (DAF) clarifier 26 to separate the solid-waste matter (aerobic bio-mass) from the wastewater in a DAF clarifier similar in operation to the DAF unit 14. The solid-waste matter (aerobic bio-mass) removed by the aerobic clarifier 26 is returned to the aerobic process tank 24 by means of a transport path 25 for continuation of the aerobic digestion process. Any excess solid-waste matter (aerobic bio-mass) is transported to the belt press 12. The wastewater within the aerobic clarifier 26 is sufficiently processed for discharge into municipal sanitary sewer or receiving streams.

All solid-waste matter received by the belt press 12 is dewatered to remove substantially all of the moisture from the solids. It should be recognized that the belt press 12 is given by way of example, rather than limitation, and any dewatering apparatus known in the art may be used in place of the belt press. Once the solid-waste by-products have been dewatered by the belt press 12, the wastewater removed by the dewatering process is recycled to either the anaerobic digester 16 or the aerobic process tank 24. The dewatered solids are composted in a compost pile 28 until ready for use in land applications such as fertilizing, fill dirt, etc.

Although a preferred embodiment of the invention has been illustrated in the accompanying drawing and described in the foregoing Detailed Description, it will be understood that the invention is not limited to the embodiment disclosed, but is capable of numerous rearrangements and modifications of parts and elements without departing from the spirit of the invention.

I claim:

1. A system for clarifying wastewater comprising:
    a storage tank for receiving inlet wastewater having solid-waste matter, the storage tank including means for stirring the inlet wastewater to maintain the solid-waste matter in the inlet wastewater in suspension;
    screening means connected to the storage tank for receiving the inlet wastewater from said storage tank and for removing solid-waste matter from the inlet wastewater and outputting a first liquid effluent and a first solid-waste;
    dissolved air flotation means connected to the screening means for receiving the first liquid effluent from the screening means and recirculated removed anaerobic bio-mass, and outputting a second liquid effluent and a second solid-waste;
    an anaerobic digester connected to the dissolved air flotation means for breaking down solid-waste matter and reducing carbonaceous biochemical oxygen demand of the second liquid effluent received from the dissolved air flotation means using a recirculated removed anaerobic bio-mass and for outputting a third liquid effluent and gases;
    anaerobic dissolved air flotation means connected to the anaerobic digester for removing the anaerobic bio-mass from the third liquid effluent received from the anaerobic digester and outputting a fourth liquid effluent and a removed anaerobic bio-mass;
    recirculating means connecting the anaerobic digester to the anaerobic dissolved air flotation means for recirculating a portion of said removed anaerobic bio-mass into the anaerobic digester;
    means connecting the dissolved air flotation means to the anaerobic dissolved air flotation means for recirculating a second portion of said removed anaerobic bio-mass for input with the wastewater into the dissolved air flotation means;
    compressor means connected to said anaerobic digester for compressing the gases output from the anaerobic digester;
    means connected to the compressor means for entraining the compressed gases from the anaerobic digester into the third liquid effluent output from the anaerobic digester prior to inputting the third liquid effluent into the anaerobic dissolved air flotation means;
    an aerobic process tank connected to the anaerobic dissolved air flotation means for breaking down solid-waste matter and for reducing carbonaceous biochemical oxygen demand of the fourth liquid effluent received from the anaerobic dissolved air flotation means using received aerobic bio-mass and outputting a fifth liquid effluent;
    aerobic dissolved air flotation means connected to the aerobic process tank for removing the aerobic bio-mass from the fifth liquid effluent received from the aerobic process tank and outputting clarified liquid and a removed aerobic bio-mass;
    means connecting the aerobic process tank to the aerobic dissolved air flotation means for recirculating a portion of said removed aerobic bio-mass from the aerobic dissolved air flotation means for input into the aerobic process tank; and
    means connected to the screening means, the aerobic dissolved air flotation means and the dissolved air flotation means for dewatering the second solid-waste received from the dissolved air flotation means, and the first solid waste received from the screening means and a portion of said removed aerobic bio-mass received from the aerobic dissolved air flotation means and for outputting a sixth liquid effluent and a third solid waste.

2. The system of claim 1 wherein the said storage tank includes an agitation means for maintaining the solid-waste matter contained in the inlet wastewater in suspension.

3. The system of claim 1 wherein the means for dewatering comprises a belt press for removing water from the second solid-waste received from the dissolved air flotation means, and the first solid-waste received from the screening means and a portion of said removed aerobic bio-mass received from the aerobic dissolved air flotation means.

4. The system of claim 1 further including means connected to the means for dewatering and the aerobic process tank for inputting the sixth liquid effluent received from the means for dewatering into the aerobic process tank.

5. The system of claim 1 further including means connected to the means for dewatering and the anaerobic digester for inputting the sixth liquid effluent received from the means for dewatering into the anaerobic digester.

* * * * *